W. W. HENDERSON.
TRANSMISSION GEARING.
APPLICATION FILED JAN. 26, 1909.
954,286.
Patented Apr. 5, 1910.
4 SHEETS—SHEET 1.
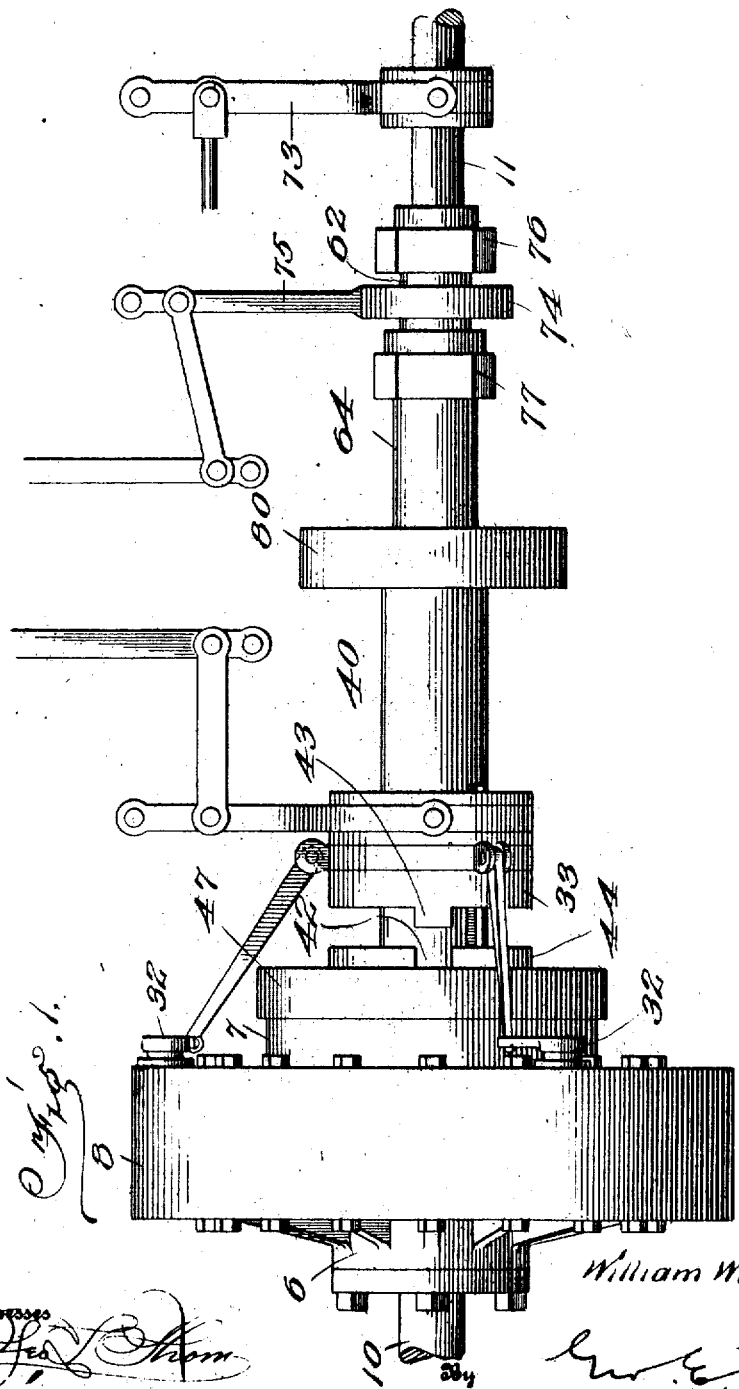

W. W. HENDERSON.
TRANSMISSION GEARING.
APPLICATION FILED JAN. 26, 1909.
954,286.
Patented Apr. 5, 1910.
4 SHEETS—SHEET 2.
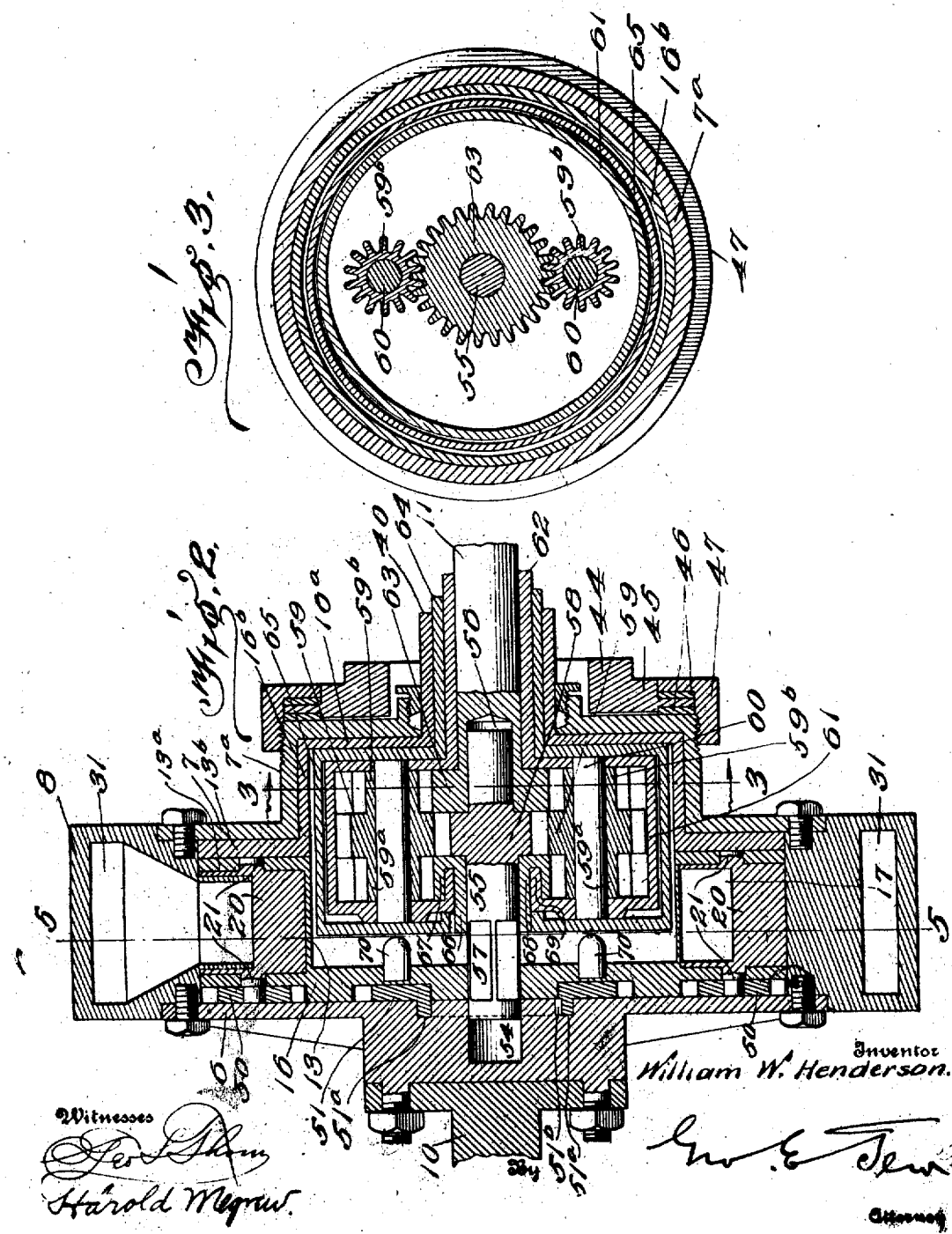
Witnesses
Inventor
William W. Henderson.

W. W. HENDERSON.
TRANSMISSION GEARING.
APPLICATION FILED JAN. 26, 1909.
954,286.
Patented Apr. 5, 1910.
4 SHEETS—SHEET 3.
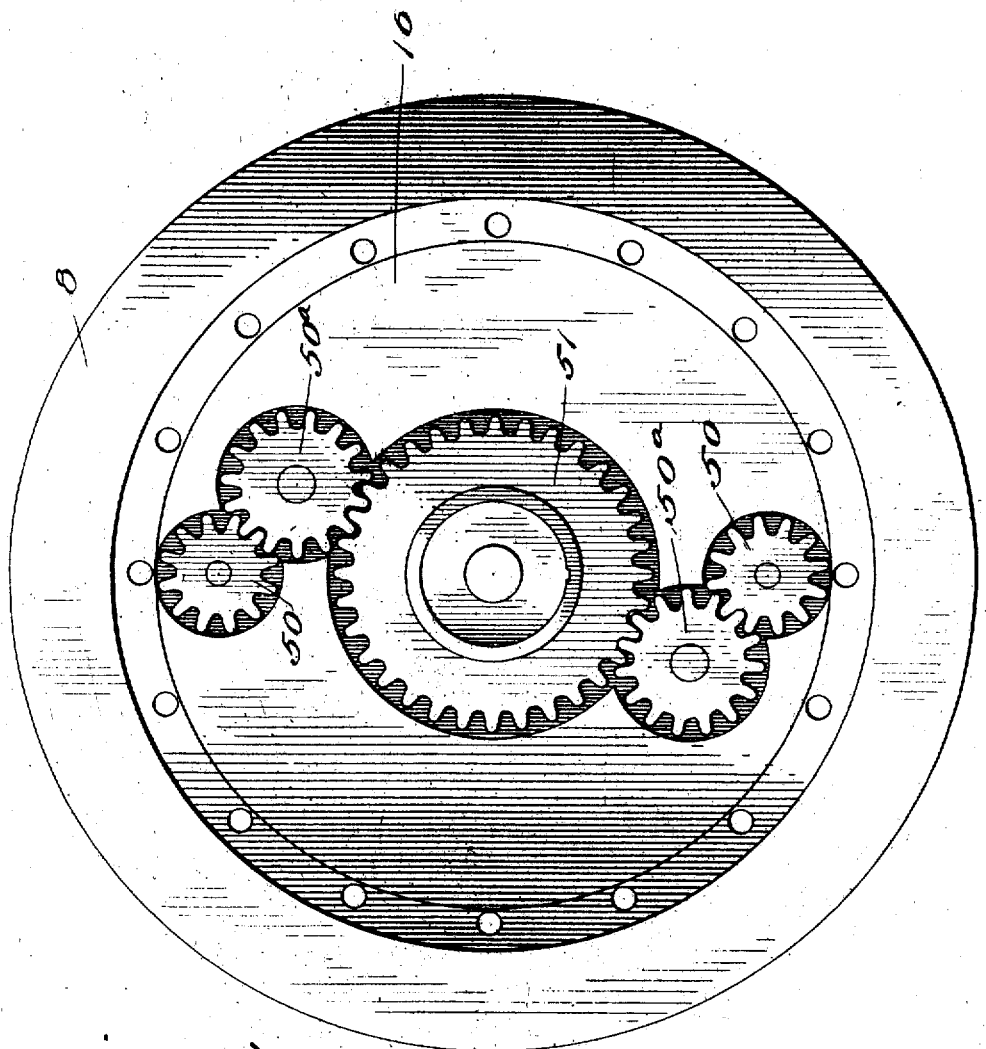
Inventor
William W. Henderson.

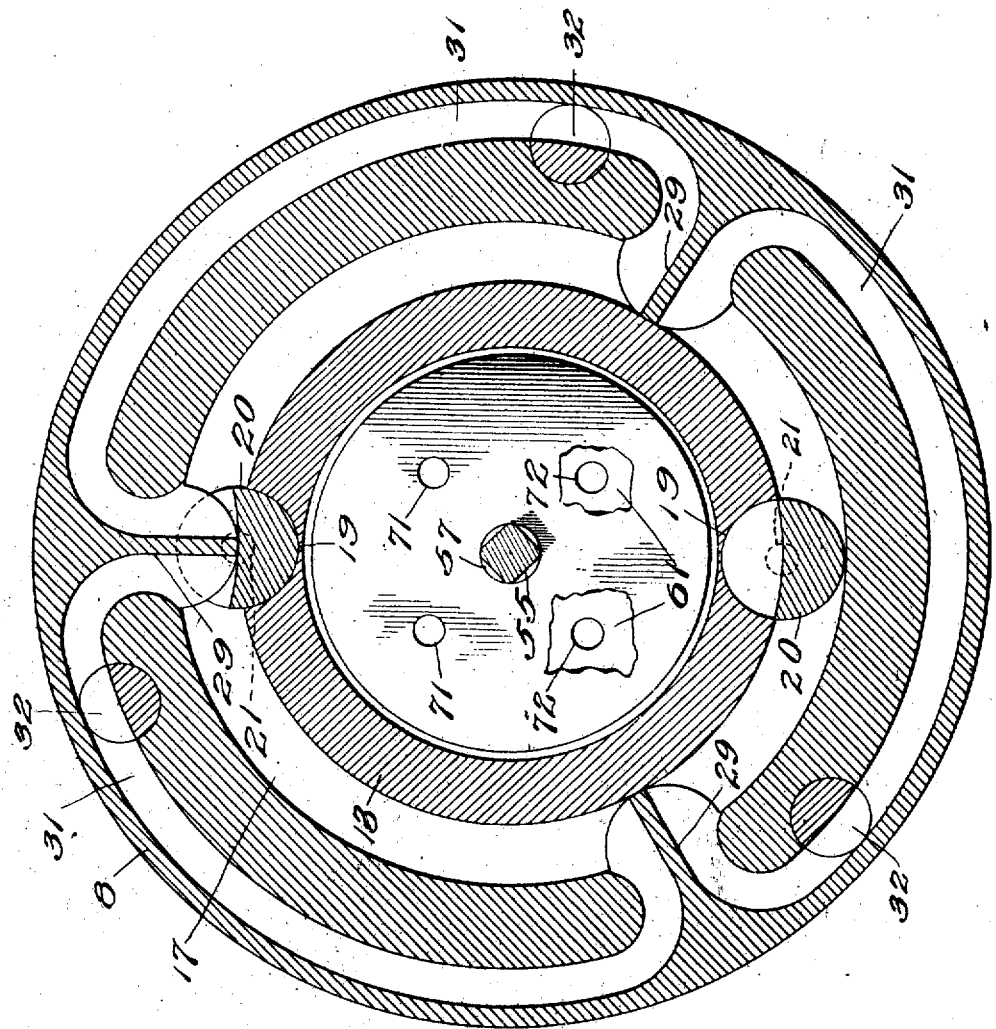

UNITED STATES PATENT OFFICE.

WILLIAM W. HENDERSON, OF WASHINGTON, DISTRICT OF COLUMBIA.

TRANSMISSION-GEARING.

954,286.   Specification of Letters Patent.   Patented Apr. 5, 1910.

Application filed January 26, 1909. Serial No. 474,260.

*To all whom it may concern:*

Be it known that I, WILLIAM W. HENDERSON, a citizen of the United States, residing at Washington, District of Columbia, have invented certain new and useful Improvements in Transmission-Gearing, of which the following is a specification.

This invention relates to transmission gearing, and comprises a change speed and reverse gearing, and includes also the hydraulic clutch substantially as shown and described in my U. S. Patent No. 879,045, dated Feb. 11, 1908.

One of the objects of the invention is to apply to or combine with said clutch a transmission gearing located within the same casing as the clutch, whereby space is economized and a simple construction is produced, avoiding the necessity for an intermediate shaft and connections, the clutch casing also acting as a fly wheel, and the whole device providing an improved direct connection between the engine shaft and the driven shaft.

The invention is capable of general application, but is intended especially for use in connection with motor vehicles. As disclosed, the device will provide two speeds on the forward drive and one speed on the reverse, by means of a planetary gearing combined in a novel manner with the clutch.

An especial feature of the invention is that on the direct or high speed drive the planetary gears are idle, whereby the objectionable noise and wear incident to constant rotation, as in some gears, is avoided.

The invention is illustrated in the accompanying drawings in which—

Figure 1 is a side elevation of the clutch and gearing; Fig. 2 is a longitudinal section in the axis of the shaft; Fig. 3 is a section on the line 3—3 of Fig. 2; Fig. 4 is an interior end elevation, the back plate of the clutch casing being removed; Fig. 5 is a section on the line 5—5 of Fig. 2.

Except for modifications shown and noted, the clutch is the same as that shown in my patent mentioned, and will be briefly described.

6 indicates the back plate of the clutch casing and 7 the front plate, the latter being boxed or offset as indicated at 7ª to give sufficient space for the transmission gearing within the same. A weighted rim 8 is bolted between the plates and acts as a fly wheel. The engine or crank shaft 10 is shown bolted to the back of the hub of the plate 6, and thus the casing and fly wheel are driven with said shaft. The driven shaft is indicated at 11 and projects at its end within the casing referred to.

Fitting within the casing and against the back plate 6 is a circular plate 16 formed integral with a hollow block or wall 13 which forms the inner wall of the annular fluid chamber 17 the outer wall of which is formed by the rim 8. At its front or free end the wall 13 joins a ring plate 13ª which in turn is fastened to the outwardly projecting flange 13ᵇ at the inner end of a box formed by a flange 16ᵇ projecting from the outer edge of a front plate 16ª which is formed at the rear or inner end of a sleeve 40 to be hereinafter more particularly described and which projects through the front plate of the casing. Within the fluid chamber are rolling pistons 20, as described in my said patent. The chamber 17 is divided by partitions 29 into several compartments the ends of which are connected by by-passes 31 controlled by valves 32, also in the manner described in said patent. The block 13 is recessed as at 19 to allow the pistons to turn therein. The parts 13 and 13ª might be made integral, but are made separate for convenience of manufacture. Each piston has trunnions 21 mounted in bearings, as shown. Instead of the internal ring gear for driving the pistons, as shown in my said patent, the present structure has a gear 50 on one trunnion of each piston, driven by a spur gear 51 through an intermediate gear 50ª, said gears being set in appropriate recesses made in the back of the plate 16. The annular spur gear 51 is made fast to the back plate 6 of the casing by means of a flange 51ª and key 51ᵇ, whereby the pistons are turned to pass the abutments 29 when the inner and outer parts of the clutch rotate with respect to each other, as described in my said patent. The valves 32, controlling the relative movement of the parts, may be operated by the means shown in said patent, and also shown herein, or by any other suitable means.

It is believed that this description, in connection with the disclosure in the said patent, will enable the operation of the clutch to be easily understood, but it is broadly stated as follows. The outer clutch casing rotates with the shaft section 10, and when the valves 32 are open as shown in Fig. 5 the gears 50 and 50ª cause the pistons 20 to travel or roll around in the chambers 17 and by their movement force the fluid around through the passages 31 without movement of the driven parts. By closing the valves more or less the passage to the fluid will be obstructed to a greater or less extent and consequently the motion or variable speed will be transmitted to the circular plate 16 and thence to the change speed gearing and shaft 11 as hereinafter described.

The formation of the walls 13, 16$^b$ and 16$^a$ produces an internal chamber or box which contains the planetary gearing which effects the speed changing result.

The hub of the back plate 6 is bored, as indicated at 54, to receive and form a bearing for the round end of an intermediate or loose shaft 55 the other end of which has a bearing in a bore 56 in the end of the driven shaft 11. The shaft section 55 is squared or truncated as indicated at 57 and fits in a similarly shaped hole in the plate 16, so that when said plate is rotated the shaft section is also rotated. This shaft section has thereon a gear 58 which meshes with the middle members 59 of triple planetary pinions loose on shafts 60 which are fixed at their ends in a gear casing 61 formed as a box at the end of a sleeve 62 on the shaft 11, which sleeve, when held, forms the low speed sleeve, as hereinafter described. The other members 59$^a$ and 59$^b$ of the triple pinions are of less diameter than the intermediate member 59, and coöperate respectively with the reverse and low speed devices. The driven shaft 11 has at the inner end thereof a spur gear 63 which meshes with the pinion 59$^b$. The reverse sleeve 64 extends within the outer sleeve 40 which is connected to the inner part of the clutch, and the low speed sleeve 62, and said reverse sleeve is boxed at the inner end, as indicated at 65, around the planetary gear casing 61, and the inner wall of the box 65 is keyed to the sleeve 66 of the gear 67, said gear being loose on the shaft section 55, and being preferably grooved as at 68 to form a bearing for the flange 69 on the back wall of the gear casing 61.

The back plate 16 of the clutch is provided with fixed pins 70, which are adapted to enter holes 71 in the back wall of the box 65, and through them into holes 72 in the back wall of the box 61, thereby locking the gear casings to the inner clutch member. It will be seen that the whole planetary gearing may be shifted to enter the pins in said holes, this action being permitted by the size of the chamber in the clutch containing said gearing, and when this is done the rear end of the shaft section 55 slides in the recess 54. The shaft 11 may be shifted by any suitable means. I have shown a lever 73. When the shaft and the transmission gearing are shifted, as stated, the pins entering the holes in the gear boxes lock the parts together, and, the clutch member 16 being driven, the shaft will be turned at the same speed, thus producing the direct drive at full speed. For the low speed, the shaft is shifted to disengage the planetary gearing from the pins 70, as shown in Fig. 2. Then the low speed sleeve 62 and its casing 61 are held against rotation by any suitable means. The shaft section 55 being then rotated, drives the pinions 59, on shafts 60, the motion of which is communicated through pinions 59$^b$ and gear 63 to the shaft 11, giving a low speed forward, in proportion to the relative sizes of the pinions and gears. For holding the sleeve 62 I show a socket 74 at the end of an arm 75 which may be shifted to throw the socket over a nut 76 fast on the sleeve 62. For the reverse, the sleeve 64 and its box 65 are held. The intermediate shaft section 55 being then driven, the motion is communicated through the planetary pinions and the pinion 59$^a$ travels around the held gear 67 in reverse direction, thereby driving the shaft in reverse through pinions 59$^b$ and gear 63. For holding the reverse sleeve a nut 77 is provided thereon, on the opposite side of the socket 74 to the nut 76 and said socket may be shifted in opposite direction to engage said nut. The single lever connected to the socket 74 may therefore be operated to throw either the low speed or the reverse in gear.

The present device retains the positive clutch feature of the former patent, said clutch being operative when the fluid clutch is fully engaged, the sleeve 33 being shifted by a suitable lever and collar connection, and having projections 43 which enter notches 42 in the hub of a ring 44 the rim 45 of which is frictionally engaged between packing 46 clamped to the clutch casing by a ring nut 47 with pressure sufficient to transmit positively any ordinary strain, but allowing slip under excessive conditions. The sleeve 40, connected to the inner or driven part of the clutch, may be provided with a wheel 80 to receive a band brake, for braking the drive, if desired.

When the sleeve 33 is shifted toward the gear casing to a sufficient extent, the lug 43 will enter the notch 42, thereby completing a positive clutch between the gear casing and the sleeve, thereby operating to positively drive the sleeve 40 to which the sleeve 33 is keyed and from the sleeve 40 the motion is transmitted through the change speed gearing above described, to the driven shaft 11. This gives a positive clutch between the driven casing 8 and the change speed gearing, instead of the fluid clutch above described.

I claim:

1. The combination of a clutch member, a shaft, shiftable change speed gearing operatively connecting the clutch member and the shaft, additional means to connect the clutch member and the gearing, said means being connected or disconnected by shifting the gearing, and means to shift the gearing to connect or disconnect said additional means.

2. The combination of a clutch member, a shaft, change speed gearing on the shaft, comprising a casing and planetary gears, means normally connecting said member and the gearing, and additional means to operatively connect the said member and the said casing, said gearing being shiftable on the shaft to connect or disconnect said additional means.

3. The combination of a clutch having driving and driven members, a shaft, change speed gearing between the driven clutch member and the shaft, means for normally connecting the driven clutch member and the gearing, and additional means for connecting said member and gearing, said gearing being shiftable independently of both clutch members to operatively connect or disconnect said additional means.

4. The combination of a clutch, a shaft, and transmission gearing mounted on the shaft, connecting devices between the gearing and the clutch, and additional connecting devices between the gearing and the clutch, the gearing being shiftable independently of the clutch to operatively connect or disconnect said additional devices with the gearing.

5. The combination of a rotary driving member, a driven shaft, an intermediate coaxial shaft, a gear thereon, said shaft having a positive engagement with said rotary member, and change speed gearing having a casing and planetary gears carried thereby meshing with the intermediate gear, and means to lock the casing to the driving member when desired.

6. The combination with a hollow clutch member, of a shaft extending into the same, and planetary gearing located on the shaft, and inclosed within said member, said gearing including a casing reduced to form a sleeve on the shaft and projecting outside of said clutch member.

7. The combination of a rotary driving member having an opening therein, a driven shaft, a supplemental shaft arranged in axial alinement between the driven shaft and said member and having a sliding engagement with said member, change speed gearing mounted on the said shafts and operatively connected thereto, and means actuated by axial movement of the shafts to directly engage the change speed gearing with the driving member.

8. The combination of a rotary driving member having pins projecting therefrom, a driven shaft, a supplemental shaft arranged in axial alinement between the driven shaft and said member and having a sliding engagement with said member, change speed gearing mounted on the said shafts and operatively connected thereto and having a casing provided with openings to receive said pins to directly engage the said gearing and the driving member, and means to shift the shafts endwise to engage or disengage said pins.

9. The combination of a clutch having an outer driving member provided with an axial bearing, an inner driven member, a driven shaft, a supplemental shaft arranged in axial alinement with the driven shaft and shiftable lengthwise therewith and mounted in said bearing and having a driving engagement with the driven clutch member, planetary gearing operatively mounted between the driven shaft and the supplemental shaft and shiftable therewith, the planetary gearing and driven member being provided with devices for direct engagement, and means to shift the shafts and gearing to engage or disengage said devices.

10. The combination of a driving member, a driven shaft, a supplemental shaft positively driven by said driving member and located in axial alinement with the driven shaft, change speed and reverse gearing operatively mounted on and between the shafts, and having a gear casing reduced to form a sleeve extending along the driven shaft and also having an outer reversing casing reduced at one end to form a sleeve inclosing said sleeves, and means engageable with the said sleeves to control said gearing for the intended purpose.

11. The combination of a driven shaft, a gear thereon, a supplemental shaft, a gear thereon, said shaft being arranged in axial alinement with the driven shaft, a reversing casing rotatable on said shafts, a gear therein, a direct low-speed drive casing rotatable on said shafts and located within said casing, and planetary gears carried in said direct drive casing and operatively engaging the gears on the shafts and on the reversing casing, means to directly lock the gear casings to the supplemental shaft, and means to hold either of the casings against rotation, to operate the low-speed or reverse devices, as described.

In testimony whereof, I affix my signature in presence of two witnesses.

WILLIAM W. HENDERSON.

Witnesses:
 GEO. S. THOM,
 GEO. E. TEW.